3,703,380
BAKING PROCESS USING POLYOXYETHYLENE FATTY ETHERS AS SOFTENERS AND CONDITIONERS
Roy Kenneth Langhans, Newark, Del., assignor to ICI America Inc.
No Drawing. Filed Aug. 28, 1970, Ser. No. 67,971
Int. Cl. A21d 2/14
U.S. Cl. 99—91
6 Claims

ABSTRACT OF THE DISCLOSURE

Yeast-raised baked goods such as bread are improved in softness and texture by the addition to the dough mix of polyoxyethylene fatty ethers having the general formula $$R-CH_2-O-CH_2CH_2-O(CH_2CH_2O)_xCH_2CH_2OH$$

wherein R is an acyclic hydrocarbon radical having 11 to 21 carbon atoms and $x$ is an integer of 2 to 38.

---

The invention involves the novel use of polyethoxylated fatty ethers in baking formulations for yeast-raised products such as bread, rolls, pastries, etc., to act as a combined softner and conditioner for the baked product. Crumb softness afforder by the ethers of this invention is excellent and better than that obtainable with any other known single additive.

In particular, the invention involves the use of polyoxyethylene fatty ether additives in dough mixes to retard staling in the raised baked product.

In the manufacture of bread and other yeast-raised bakery products for sale, it is desirable that they have a relatively soft, stable crumb for a period of at least 3 to 6 days as well as a uniformly fine grain structure of low density. Since the staling or hardening of baked goods containing starches is generally attributed to starch retrogradation, accompanied by the migration of moisture from the gelatinized starch to the coagulated gluten, many retardants have been employed which can be generally classified as edible polyhydric organic compounds and fatty acid derivatives thereof. Another widely used class of staling retardants encompasses a number of polyoxyethylene compounds derived from the reaction of ethylene oxide ($CH_2CH_2O$) with fatty acid and phosphate esters and, more often hydroxy fatty esters of glycerine, glycol, mannitol, sorbitol, glucose, and hydroxy acids.

Shortening compositions containing polyoxyalkylene derivatives having the general formula $$R-OCH_2CH_2O-(CH_2CH_2O)_x-H$$

where R is an alkyl radical having 1 to 4 carbon atoms and $x$ is 1–7 have been disclosed in U.S. Pat. No. 3,320,090.

In using a single retardant additive from the above compositions in bread making for example, good grain quality and density is sometimes sacrificed to prevent staling, whereas in other cases staling resistance is sacrificed to gain good grain quality and density. In order to form products which are improved in all three properties, it is necessary to incorporate several additives with the dough mix.

It is the object of this invention to provide a raised, starch-containing baked product having stable crumb softness, low density, and good grain quality in addition to staling resistance.

The object is accomplished by incorporating in the dough mix of the bread or other yeast-leavened bakery product before baking a polyoxyethylene ether having the general formula:

R—CH₂—O—CH₂CH₂O
[CH₂CH₂—O]ₓ—CH₂CH₂—OH wherein $x$ is an integer of 2–38 and preferably 6–18, and R is a an aliphatic hydrocarbon radical having from 11–21 carbon atoms.

Such polyoxyethylene ethers are usually made by reacting a fatty alcohol with ethylene oxide under pressure in the presence of a base catalyst. The aliphatic alcohols which form suitable ethers comprise acyclic unsubstituted, preferably straight chain, monohydric alcohols containing from 12–22 carbon atoms and no oxygen other than that of the hydroxyl radical. The alcohols may be unsaturated although it is preferred to select those containing no more than two carbon-to-carbon double bonds. Preferred alcohols include lauryl, myristyl, cetyl, stearyl, eicosyl docosyl, oleyl, isooleyl, linoleyl, and erucyl and mixtures of these obtained by the reduction of the fatty acids or esters occurring in natural fats and oils.

These alcohols are condensed with ethylene oxide at mol ratios ranging from 4–40 mols ethylene oxide per mol of alcohol. Preferred compositions are made by condensing 4–10 mols/mol of alcohol. A composition resulting from 10 mols of ethylene oxide and stearyl alcohol is designated polyoxyethylene (10) stearyl ether or 10 dendro stearyl alcohol.

The polyoxyethylene ether compounds can be used in several ways in the practice of the invention. While in the standard techniques the additive is placed in the bread dough mix as described in the examples, it would be equally operable if it were preblended with any of the solid ingredients or dissolved in liquid shortenings.

The additive is employed in concentrations of 0.1–3% based on the total weight of the flour.

The following examples illustrate the improvements offered by the invention:

EXAMPLES 1 AND 2

A series of two bread formulations are presented to demonstrate the effectiveness of polyoxyethylene ether derivatives as a conditioner and retardant to staling as compared with untreated loaves.

| Sponge formula: | Percent by wt. (based on total flour) |
|---|---|
| Flour | 65 |
| Water | ¹ 37.2 |
| Yeast | 2.5 |
| Yeast food | 0.5 |
| Dough formula: | |
| Flour | 35 |
| Sugar | 8 |
| Salt | 2 |
| Shortening (lard) | 3 |
| Non-fat dry milk solids | 6 |
| Water | ¹ 28.2 |
| Polyoxyethylene ether | 0.5 |

¹ (Variable) base on Farinograph absorption. Use 57% of total water in sponge and 43% of total water in dough.

Procedure

Yeast and yeast food are dissolved in part of the sponge water and added to the sponge ingredients which are then kneaded at room temperature (≈75° F.) for 5 minutes. The mix is allowed to ferment for a period of 4.5 hours at 86° F. and 75% R.H.

Sponge, dough water, and one-half of the dough flour are blended along with the remaining ingredients with the exception of the shortening. The remaining flour and lard are added and the dough is mixed to optimum consistency. The dough is fermented for 20 minutes at 86° F., 75% R.H.

The dough is divided into 18-oz. portions, rounded, placed into bread pans, and allowed a 10-minute proof at 86° F., 75% R.H. After proofing, the dough is sheeted, moulded, sealed, and placed into bread pans. The dough is then proofed at 100° F., 85% R.H. for 55-60 minutes to a height of 1⅛ inches above the pan. When baked for 20 minutes at 425° F., the volume of each loaf is measured upon cooling for 1 hour. Loaves are then placed in plastic bags, sealed, and stored at room temperature (≈76° F., 50% R.H.) for a period of 6 days.

After 3 days and 6 days of storage, five one-half inch slices are taken from the middle of each loaf and are tested at three locations on each slice for softness and observed for crumb, grain, and texture. The test results which are located in Table I are the average for 20 loaves.

wherein R is an acyclic hydrocarbon radical having 11-21 carbon atoms and $x$ is an integer of 2-38.

2. The preparation of claim 1 wherein $x$ is an integer of 6-18.

3. The preparation of claim 1 wherein R is a straight chain hydrocarbon radical.

4. The preparation of claim 1 wherein R is a hydrocarbon radical having no more than two carbon-to-carbon double bonds.

5. The preparation of claim 1 wherein $x$ has a value of 8 and R is a saturated hydrocarbon radical having 17 carbon atoms.

TABLE I

| Additive | Loaf volume increase (cm.³ above control) | Softness index [1] | | | Grain structure [2] | | |
|---|---|---|---|---|---|---|---|
| | | 3 days | 6 days | Avg. | 3 days | 6 days | Avg. |
| Example: | | | | | | | |
| 1 ............ Polyoxyethylene (10) stearyl ether [3] | 166 | 0.65 | 0.67 | 0.66 | 10.4 | 9.8 | 10.1 |
| 2 ............ Polyoxyethylene (20) stearyl ether [4] | 171 | 0.71 | 0.71 | 0.71 | 10.1 | 9.5 | 9.8 |
| Control ...... None | | 1.00 | 1.00 | 1.00 | 10.0 | 8.9 | 9.5 |

[1] Softness index: $\frac{\text{Reading of sample}}{\text{Reading of control}} = 1$

[2] Grain structure:
Visual rating: Numerical rating
Very good ........... 11
Good ............... 8
Fair ................ 5
Poor ............... 2

[3] Commercially available as BRIJ® 76 by Atlas Chemical Industries, Inc.
[4] Commercially available as BRIJ® 78 by Atlas Chemical Industries, Inc.

Instead of the specific stearyl polyoxyethylene ethers employed in the foregoing examples, other ethers defined hereinbefore could likewise have been employed to yield bread of improved properties with respect to loaf volume, softness, and grain quality.

What is claimed is:

1. In the preparation of a yeast-raised, flour-containing bakery product, which comprises preparing a dough mix and thereafter baking said mix, the improvement which comprises incorporating into the dough mix from about 0.1% to about 3% by weight based on the weight of the flour of a polyoxyethylene ether additive having the general formula:

$$R-CH_2-O-CH_2CH_2-O-(CH_2CH_2O)_xCH_2CH_2-OH$$

6. The preparation of claim 1 wherein $x$ has a value of 18 and R is a saturated hydrocarbon radical having 17 carbon atoms.

References Cited

UNITED STATES PATENTS 3,230,090   1/1966   Weiss.
3,536,497  10/1970   Jackel _____ 99—91

RAYMOND N. JONES, Primary Examiner

J. R. HOFFMAN, Assistant Examiner